(12) United States Patent
Lamberts et al.

(10) Patent No.: US 7,538,961 B2
(45) Date of Patent: *May 26, 2009

(54) USING INDUCTANCE TO MEASURE WRITER SPACING IN PERPENDICULAR MAGNETIC RECORDING

(75) Inventors: Bernd Lamberts, Cupertino, CA (US); Vladimir Nikitin, Campbell, CA (US); James Terrence Olson, Santa Cruz, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/765,650

(22) Filed: Jun. 20, 2007

(65) Prior Publication Data

US 2008/0316630 A1  Dec. 25, 2008

(51) Int. Cl.
 G11B 27/36 (2006.01)
 G11B 21/02 (2006.01)
(52) U.S. Cl. .......................... 360/31; 360/75
(58) Field of Classification Search ................. None
 See application file for complete search history.

(56) References Cited

U.S. PATENT DOCUMENTS

| | | | |
|---|---|---|---|
| 5,798,462 A * | 8/1998 | Briefer et al. | 73/722 |
| 5,978,186 A * | 11/1999 | Murata et al. | 360/123.39 |
| 6,865,040 B2 | 3/2005 | Fayeulle et al. | 360/31 |
| 2003/0067698 A1 | 4/2003 | Dakroub et al. | 360/31 |
| 2004/0264049 A1 | 12/2004 | Brown et al. | 360/234 |
| 2005/0264944 A1 | 12/2005 | Fontana, Jr. et al. | 360/313 |
| 2006/0103981 A1 | 5/2006 | Kiyono et al. | 360/126 |
| 2006/0119971 A1 * | 6/2006 | Kurita et al. | 360/69 |

(Continued)

FOREIGN PATENT DOCUMENTS

EP  1111591 A1  6/2001

(Continued)

OTHER PUBLICATIONS

Suzuki et al., "Active-head sliders for flying-height adjustments in magnetic storage" Micro Electro Mechanical Systems, 2001. 17th IEEE International Conference on (MEMS), vol., Iss., 2004 pp. 865-868.

(Continued)

*Primary Examiner*—Jason C Olson
(74) *Attorney, Agent, or Firm*—Zilka-Kotab, PC (57) ABSTRACT

A magnetic data recording system that can directly measure soft underlayer spacing of a perpendicular magnetic write head during operation. The soft underlayer spacing of the magnetic write head can be determined by measuring the magnetic inductance of the write head. The inductance of the write head varies with changes in the distance between the write pole and the soft underlayer of the magnetic medium. By connecting the write head with magnetic inductance measuring circuitry, the soft underlayer spacing can be constantly monitored during operation of the magnetic data recording system. The system can also include active fly height control such as a thermal fly height control capability. By directly measuring the soft underlayer spacing in real time during use of the data recording system, the actively fly height controlling features can be operated efficiently to precisely maintain a desired spacing between the write pole and the soft underlayer of the magnetic medium.

15 Claims, 8 Drawing Sheets

U.S. PATENT DOCUMENTS

2007/0183078 A1* 8/2007 Matsushita .................. 360/75

FOREIGN PATENT DOCUMENTS

| JP | 05325144 | 12/1993 |
| --- | --- | --- |
| JP | 2000030388 | 1/2000 |
| JP | 2001/043649 | 2/2001 |
| JP | 2001195714 | 7/2001 |
| JP | 2003007017 | 1/2003 |

OTHER PUBLICATIONS

Novotny et al., "Sensitive magnetic readback head-disk spacing measurements in recording drives" Magnetic, IEEE Transactions on, vol. 34, Iss. 4, Jul. 1998 pp. 1762-1764.

Mitsuya et al., "Novel measurements of flying height and attitudes using Michelson laser interferometry" Magnetics, IEEE Transactions on vol. 35, Iss. 5, Sep. 1999 pp. 2338-2340.

Yao-Long et al., "Flying height measurement considering the effects of the slider-disk interaction" Magnetics, IEEE Transactions on, vol. 36, Iss. 5, Sep. 2000 pp. 2677-2679.

Clegg et al., "Normal incidence polarization interferometry flying height testing" Magnetics, IEEE Transactions on, vol. 37, Iss. 4, Jul. 2001 pp. 1941-1943.

Pfirrmann, V. "Method of determining the magnetic field of a recording head by using tapes of various coating thicknesses" Magnetics, IEEE Transactions on, vol. 3, Iss. 4, Dec. 1967 pp. 625-627.

Zhi-Min et al., "Absolute head media spacing measurements in situ" Magnetics, IEEE Transactions on, vol. 42, Iss. 2, Feb. 2006 pp. 341-343.

Xinqun et al., "Head disk spacing variation suppression via active flying height control" Instrumentation and Measurement Technology Conference, 2001 IMTC 2001. Proceedings of the 18th IEEE, vol. 2, Iss. 2001 pp. 888-891, vol. 2.

Yamamoto et al., "Fly height measurement technology below 10 nm [HDD]" Magnetic Recording Conference, 2002. Digest of the Asia-Pacific, vol., Iss., 2002 pp. TU-P-26-01-TU-P-26-02.

Amei et al., "Real-time method to measure head disk spacing variation under vibration conditions" Instrumentation and Measurement, IEEE Transactions on, vol., 52, Iss. 3, Jun. 2003 pp. 916-920.

Wade, R., "The measurement of magnetic microfields" Magnetics, IEEE Transactions on, vol. 12, Iss. I, Jan. 1976 pp. 34-39.

* cited by examiner

USING INDUCTANCE TO MEASURE WRITER SPACING IN PERPENDICULAR MAGNETIC RECORDING

FIELD OF THE INVENTION

The present invention relates to perpendicular magnetic recording and more particularly to a system for determining spacing between a writer and a magnetic medium.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction substantially perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

A mentioned above, the slider flies over the magnetic disk on a cushion of air. The distance at which the slider flies above the disk is the fly height. In a perpendicular magnetic write head, the distance between the write pole and the soft underlayer of the medium is a very important parameter to writer performance. This is because the distance between the tip of the write pole and its image in the soft underlayer of the medium defines an effective write gap. Unfortunately, even if the slider fly height remains constant, the spacing between the write pole and the soft under-layer can vary due to thermal expansion of the write head itself.

Currently available methods for monitoring the fly height of the slider rely on the use of signal amplitude from the signal detected by the read sensor. Therefore, these methods monitor the fly height of the read sensor, but can not determine the height of the write head directly. Therefore, there is a strong felt need for a system or method that can be used to monitor the write head to soft under-layer spacing directly. Such a method must not compromise write head performance and would preferably not result in significant additional manufacturing cost or complexity.

SUMMARY OF THE INVENTION

The present invention provides a magnetic data recording system that can directly measure the soft underlayer spacing of a perpendicular magnetic write head during use. The data recording system includes circuitry connected with the write head for determining a magnetic inductance of the write head. Changes in magnetic inductance of the write head relate directly to the soft underlayer spacing of the write head. Therefore, by determining the magnetic inductance, or change in inductance, of the write head, the soft underlayer spacing can be directly determined.

The system can be used in conjunction with an active fly height control system. For example, such an active fly height control system could include a heating element arranged relative to the write pole such that it can selectively heat the write pole causing the write pole to thermally expand and protrude. Conversely, the heater can be turned off to allow the write pole cool and retract. By directly measuring the soft underlayer spacing of the write head, such active fly height control circuitry can be effectively used to maintain a desired soft underlayer spacing at all times during use of the data recording system.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
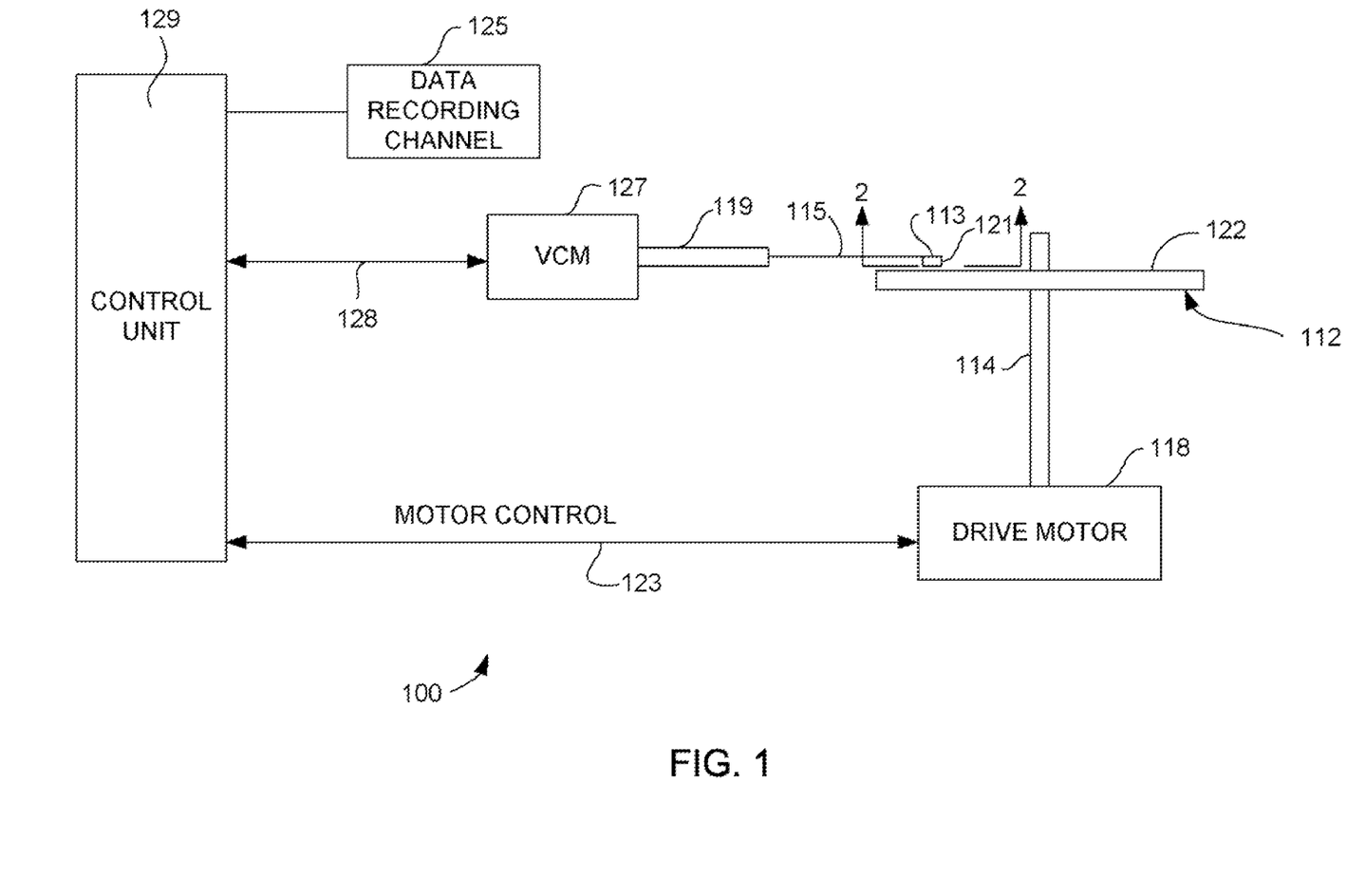
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
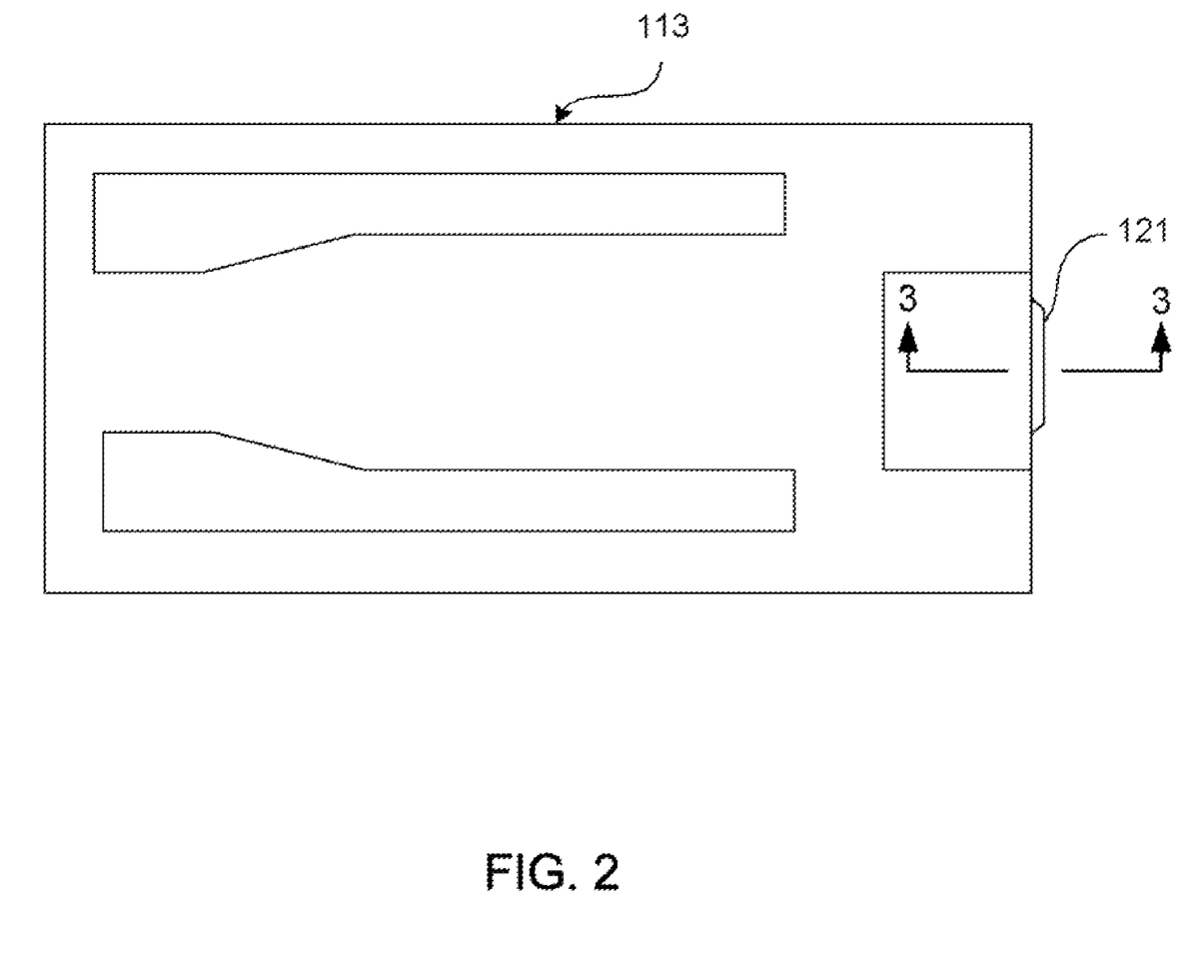
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk, storage system, and the accompanying illustration of FIG. 1 are for representation purposes only. It should be apparent that disk storage systems may contain a large number of disks and actuators, and each actuator may support a number of sliders.

Figure 3:
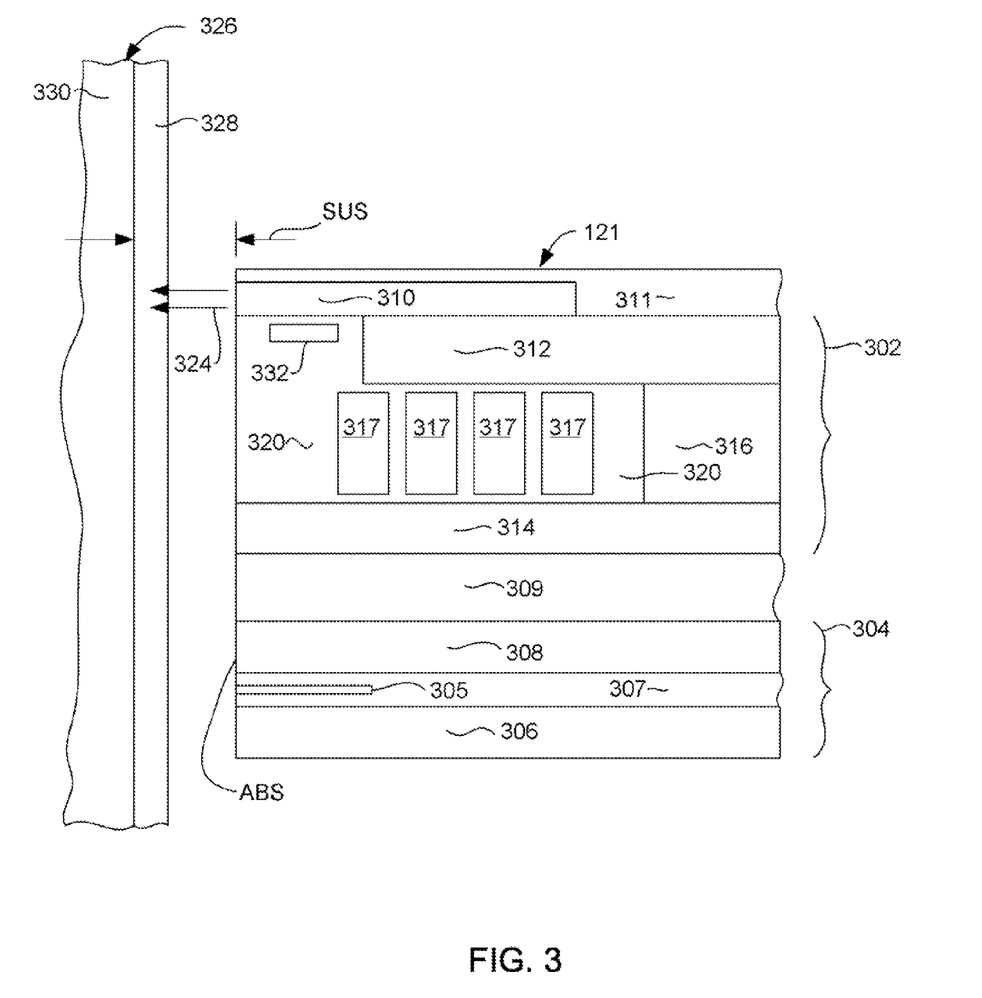
FIG. 3 is a cross sectional view view, taken from line 3-3 of FIG. 2 and rotated 90 degrees counterclockwise, of a magnetic head according to an embodiment of the present invention.

With reference now to FIG. 3, the magnetic head 121 for use in a perpendicular magnetic recording system is described. The head 121 includes a write element 302 and a read element 304. The read element includes a magnetoresistive sensor 305, such as a current in plane giant magnetoresistive (CIP GMR) sensor. However, the sensor 305 could be another type of sensor such as a current perpendicular to plane (CPP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed offer example CoFe or NiFe, absorb magnetic fields such as those from up-track or down track data signals, ensuring that the read sensor 304 only detects the desired data track located between the shields 306, 308. A non-magnetic, electrically insulating gap layer 309 may be provided between the shield 308 and the write head 302

Figure 4:
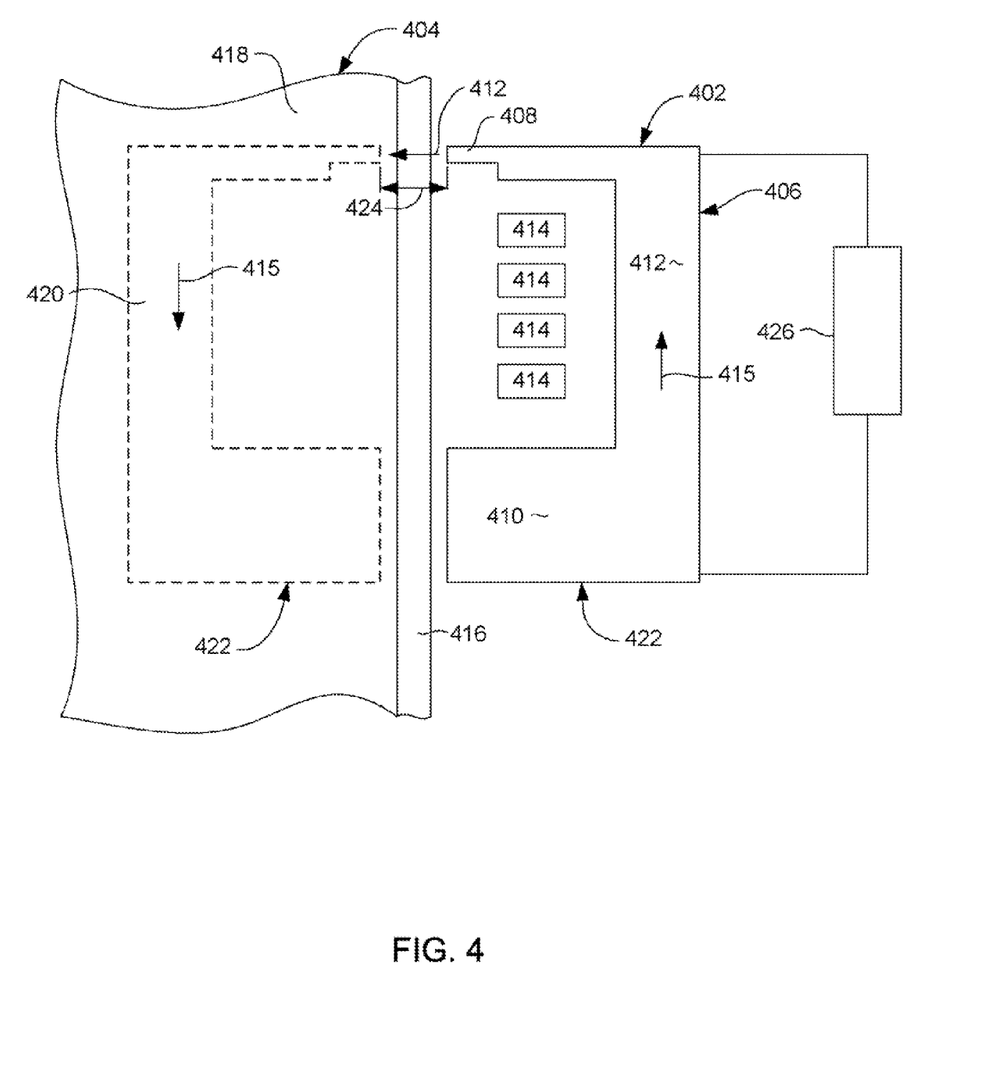
FIG. 4 is schematic illustration of a magnetic write head and magnetic medium forming a magnetic yoke.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a magnetic back gap portion 316.

The shaping layer 312, return pole 314 and back gap 316 can be constructed of for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. The insulation layers 320 can be constructed of a material such as alumina ($Al_2O_3$) or can be constructed as various layers of the same or different electrically insulating, non-magnetic materials.

When a current passes through the coil 317, the resulting magnetic field causes a magnetic flux to flow through the return pole 314, back gap 316, shaping layer 312 and write pole 310. This magnetic flux causes a magnetic write field 324 to be emitted toward an adjacent magnetic, medium 326. The magnetic medium 326 includes a thin, magnetically hard top layer 328 and a magnetically soft under-layer 330. The write field 324 locally magnetizes the magnetically hard top layer 328 and then travels through the magnetically soft under layer to return to the return pole 314, thereby completing a magnetic circuit.

The tip of the write pole 310 is separated from the soft under-layer 330 by a distance that can be called a Soft Underlayer Spacing (SUS). This distance is an important parameter to write head performance. However, because of thermal expansion of the write head 302 during use, the SUS can change, even if the fly height of the head 221 as a whole does not change. In order to take advantage of this thermal expansion to tightly control SUS, a heater element 332 can be provided in the write head 302. This heating element can be turned on to heat the write pole 310, causing it to expand as desired to extend toward the medium 326 and can be turned off to allow the write pole 310 to contract. Although write designers have previously attempted to use such heating elements to control the fly height, such attempts have met with limited success. This is because, in order to most effectively use such a heater element 332 the SUS must be continuously determined. However, even in a head that does not incorporate such a heater element 332, careful monitoring of the SUS is still important to maintain maximum writer performance.

The above description of a write head 302 describes a simple pole head having a write pole 310 with not extra magnetic shields such as a trailing shield or side shield. This is, however, in order to illustrate an embodiment of the invention in the clearest possible manner. It should be understood that the invention could just as easily be embodied in a write head having a trailing magnetic shield and/or side magnetic shields (not shown). The invention can also be embodied in a write head having a trailing return pole that connects a trailing and/or side shields (not shown) with the back gap 316. Other embodiments of the write head could also be constructed that would also fall within the scope of the invention.

With reference now to FIG. 4, a simplified schematic illustration of a write head 402 and adjacent magnetic medium 404 is shown. The write head Includes a magnetic structure 406 that includes a write pole 408, a return pole 410 and a back gap 412 that connects the write pole 408 with the back gap 412. An electrically conductive write coil 414 induces a magnetic flux 415 through the magnetic structure 406, which causes a write field 412 to be emitted across the magnetically hard top layer 416 of the magnetic medium 404.

As mentioned above, the magnetic flux 415 travels through the soft magnetic underlayer 418 of the magnetic medium to return to the magnetic structure 406 at the return pole 410. Therefore, as can be seen in FIG. 4, the magnetic medium 404 effectively becomes a part of the magnetic write head 402. Conceptually, the soft underlayer 418 of the magnetic medium 404 can be considered to form a minor image (magnetically) 420 of the magnetic structure 406 of the write head 402. Therefore, the magnetic structure 406 together with mirror image 420 form a magnetic yoke 422 having an effective write gap 424. The size of the effective write gap 424, then, is the distance between the soft underlayer 418 and the tip of the write pole 408, as shown in FIG. 4. This is the reason that the soft underlayer spacing (SUS) becomes so important to writer performance. It is this soft underlayer spacing (distance between the tip of the write pole 408 and the soft underlayer 418 that defines the effective write gap 424 of the write head.

As mentioned above, the size of this effective write gap 424 (ie. soft underlayer spacing) can vary during use due to factors such as thermal expansion of the write head 402. Furthermore, direct measurement of this effective write gap 424 or soft underlayer spacing has not previously been available. It has been found, however, that this spacing 424 can be directly measured by monitoring the magnetic inductance of the write head 402.

The soft underlayer spacing 424 can be related to the inductance of the write head 402 due to reluctance changes related to the spacing 424. This is based on the principle that the inductance of a perpendicular magnetic recording write head is a function of its spacing to the media's soft, underlayer. As the effective write gap changes, the reluctance of the path the flux 415 must take through the air from the head magnetic structure 406 to its image 418 in the soft underlayer changes. This change in reluctance causes a change in the total flux, and also a change in the inductance (which is the change in flux for a small change in current through the write coil 414. Finite element modeling predicts a 0.1% reduction in inductance from 1.97 nH for a 5 nm increase in spacing 424 with a 1 m A current in a coil 414 having 5 turns. This inductance change is detectable with the proper circuitry as will be described herein below. Therefore, the inductance of the write head 402 can he monitored by connecting impedance meter circuitry 426 with the magnetic structure 406 of the write head 402.

Figure 5:
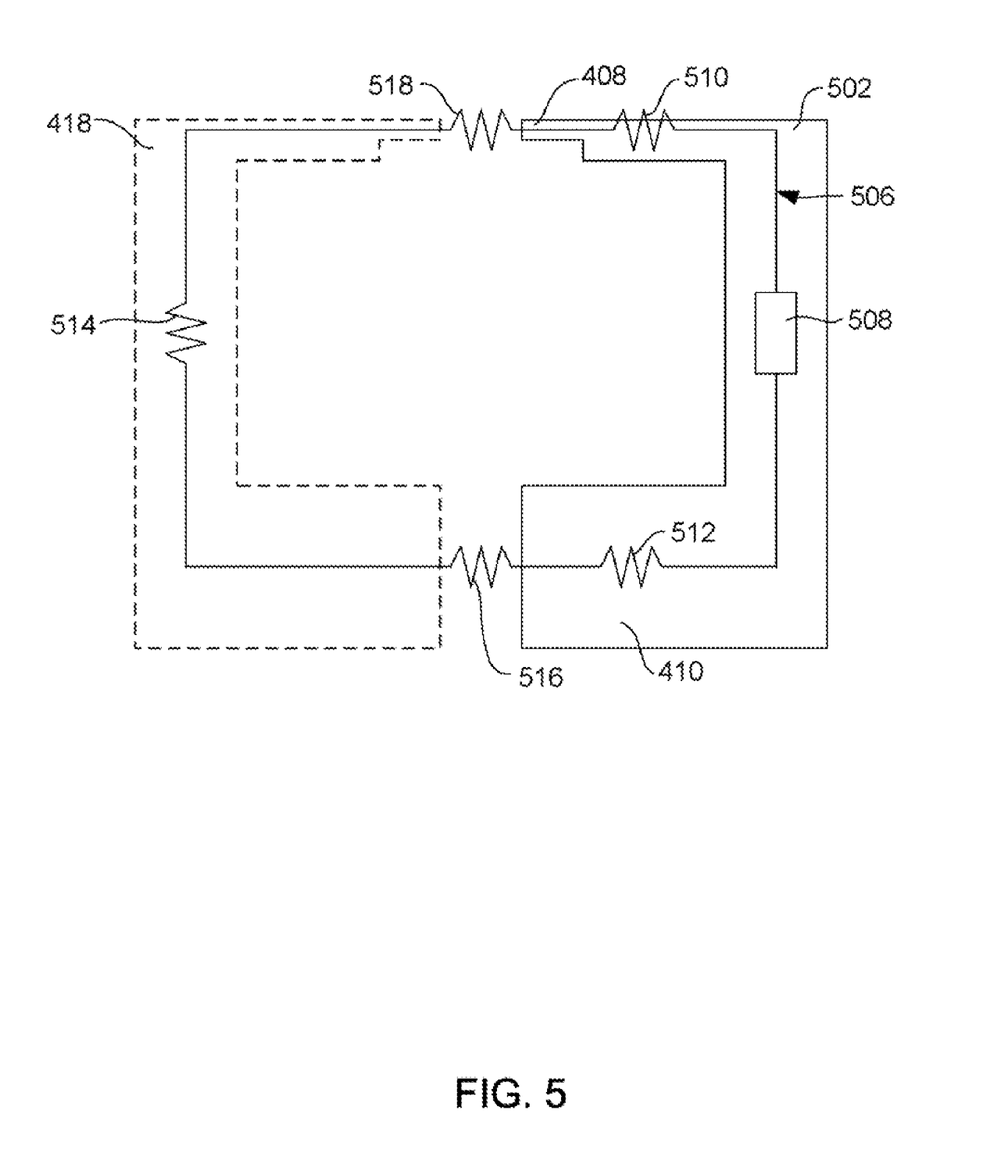
FIG. 5 is a schematic illustration showing a relationship between magnetic impedance and head to soft underlayer spacing.

With reference now to FIG. 5, a write head 502 and soft underlayer 418 can be modeled as a closed circuit 506. A magnetomotive force such as from the write coil 414 (FIG. 4) can be modeled as a voltage potential 508 applied to the circuit 506. The reluctance of the write pole 408 ($R_{WP}$) can be modeled as a resistor 510. Similarly, the reluctance of the return pole 410 ($R_{RP}$) can be modeled as a resistor 512. The reluctance of the soft underlayer 418 ($R_{SUL}$) can be modeled as a resistor 514. The reluctance of the gap between the return pole 410 and the soft underlayer 418 (head to soft underlayer spacing at the return pole ($R_{HUS-RP}$)) can be modeled as a resistor 516. Similarly, the reluctance of the gap between the write pole 408 and soft underlayer 418 (head to soft underlayer spacing at the write pole ($R_{HUS-WP}$)) can De modeled as a resistor 518. A change in head to soft underlayer spacing results in a change in reluctance that can be modeled as a change in resistance of the resistors 516, 518. As discussed above, a change in head to soft underlayer spacing results in a change in reluctance which results in a change in flux flow through the write head 502. Therefore, this resulting change in current can be modeled as a change in current through the circuit as a result of the change resistance of the resistors 516, 518. The change in inductance can be measured with an impedance meter.

Figure 6:
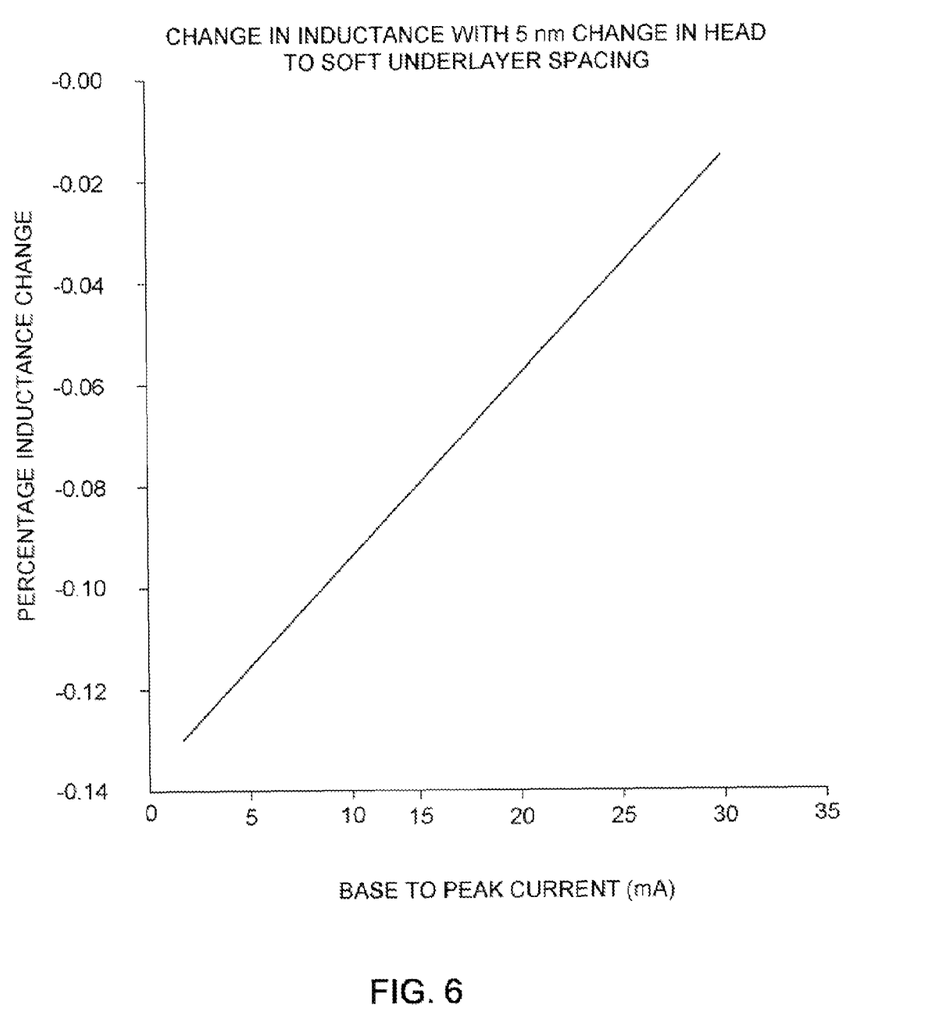
FIG. 6 is a graphical illustration of a relationship between write coil current and percentage of inductance change for a given change in head to soft underlayer spacing.

With reference now to FIG. 6, the relationship between write coil current and a change in inductance is graphically illustrated. The write coil current is shown as the base to peak current through the write coil. As can be seen, this relationship between write coil current and inductance change is for a particular change in head to soft underlayer spacing. A different change in head to soft, underlayer spacing will have a different relationship between write coil current and percentage of inductance change (and a different slope). This difference in relationship can be used to determine the head to soft layer spacing.

Figure 7:
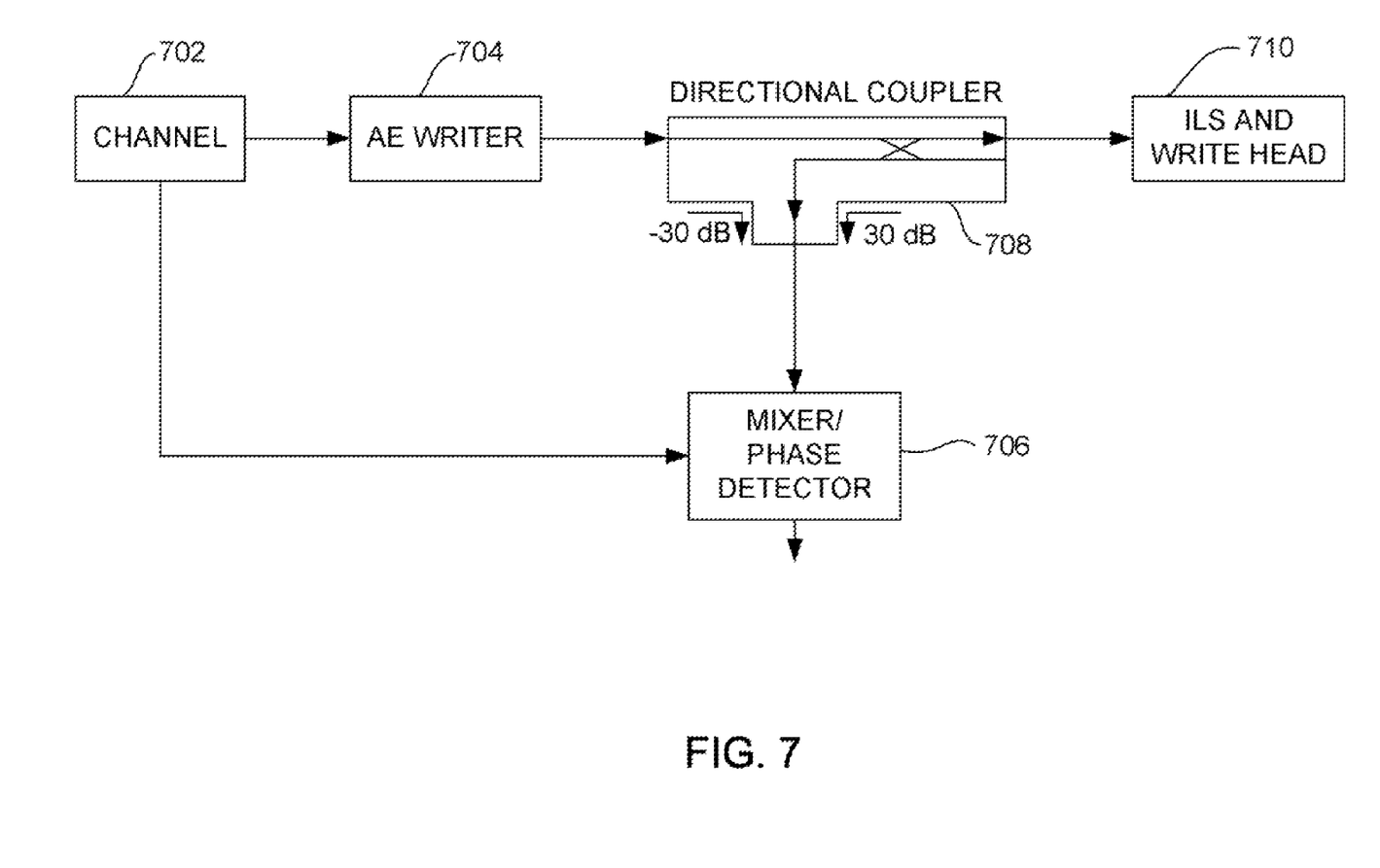
FIG. 7 is a schematic representation of circuitry for measuring an inductance of a write head.

With reference to FIG. 7 a system for monitoring head to soft underlayer spacing is shown schematically. A circuit used to measure the inductance of the write head can be similar to a circuit used in a network analyzer. Data recording channel circuitry 702 generates sinusoidal write current through the writer amplifier electronics (AE Writer) 704 and also sends a reference signal to a mixer/phase detector 706. The excitation current from arm electronics circuitry 704 passes to the head through and then to a directional coupler 708, and the voltage reflected from the head 710 is deflected through directional coupler to a mixer/phase detector 706. The amplitude of the reflected voltage from the head is proportional to the change of the inductance.

Therefore, as described above, it can be seen that the present invention provides a method for directly measuring write head to soft underlayer spacing in a perpendicular magnetic data recording system. Furthermore, this measurement of write head to soft underlayer spacing can be performed with very little additional manufacturing complexity or cost. The measurement of write head to soft underlayer spacing can be used to control an active fly height control system such as a thermal fly height control system such as that described above that controls write pole protrusion by using a heating element near or adjacent to the write pole.

Figure 8:
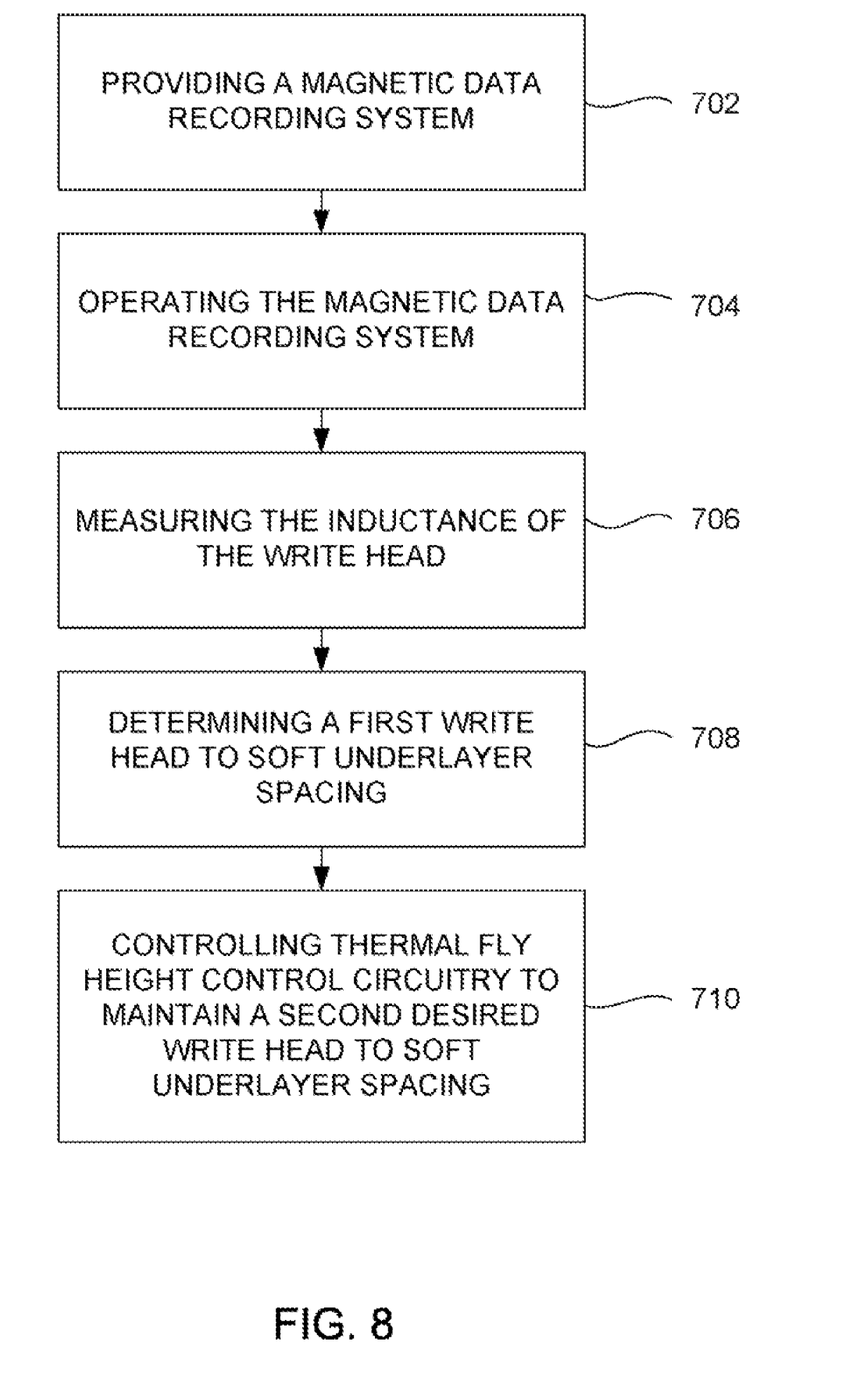
FIG. 8 is a flow chart illustrating a method for monitoring a write head to soft underlayer spacing in a magnetic write head.

With reference to FIG. 8, a method for maintaining a desired soft underlayer spacing is described. First, in a step 702, a magnetic data recording system is provided such as that described above. Then, in a step 704, the magnetic data recording system is operated such that the write head flies over the magnetic medium, being separated from the soft underlayer by a first soft underlayer spacing. Then, in a step 706 the magnetic inductance of the write head is measured, and in a step 708, the first soft underlayer spacing is determined based on the inductance of the write head. Then, in a step 710, a fly height control mechanism such as thermal fly height control circuitry, which may include a heating element is used to adjust the write pole protrusion to maintain a second, desired, soft underlayer spacing.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic data recording system, comprising:
    a magnetic write head; and
    circuitry connected with the write head for measuring a magnetic inductance of the write head; wherein the write head further comprises:
        a magnetic write pole;
        a magnetic return pole, the magnetic return pole being magnetically connected with the magnetic write pole in a region removed from and an air bearing surface;
        an electrically conductive write coil arranged relative to the write pole and return pole so as to induce a magnetic flux through the write pole and return pole when and electrical current flows through write coil;
    a heating element arranged relative to the magnetic write pole to heat the write pole; and
    circuitry connected with the heating element to control heating of the heating element based on a measured fly height.

2. A magnetic data recording system as in claim 1 further comprising circuitry for measuring the fly height based on the magnetic inductance.

3. A magnetic data recording system as in claim 1 wherein the write head further comprises:
    a magnetic write pole;
    a magnetic return pole, the magnetic return pole being magnetically connected with the magnetic write pole in a region removed from and an air bearing surface; and
    an electrically conductive write coil arranged relative to the write pole and return pole so as to induce a magnetic flux through the write pole and return, pole when and electrical current flows through write coil.

4. A magnetic data recording system as in claim 1 wherein the circuitry connected with the write head for measuring a magnetic inductance of the write head includes mixer and phase detector circuitry.

5. A magnetic data recording system as in claim 1 wherein the circuitry connected with the write head for measuring a magnetic inductance of the write head comprises an impedance meter.

6. A magnetic data recording system, comprising:
    a magnetic medium, the magnetic medium having a magnetically soft underlayer and a magnetically hard top layer formed thereover;
    a slider having an air bearing surface;
    an actuator mounted with the slider for moving the slider over a surface of the magnetic medium, such that the air bearing surface of the slider faces the surface of the magnetic medium;
    a write head formed on the slider, the write head having a write pole with a pole tip disposed at the air bearing surface during use, a distance between the tip of the write pole and the soft magnetic underlayer of the magnetic medium defining a soft underlayer spacing;
    circuitry connected with the write head for measuring the magnetic inductance of the write head; and
    circuitry for calculating the soft underlayer spacing based on the inductance of the write head.

7. A data recording system as in claim 6 further comprising a magnetic heater arranged relative to the write pole to heat the write pole to cause the write pole to expand and contract.

8. A data recording system as in claim 7 further comprising circuitry for determining a soft underlayer spacing based upon the inductance of the write head, and further comprising circuitry connected with the heater to selectively control the heater based upon the determined soft underlayer spacing.

9. A magnetic data recording system as in claim 6 wherein the circuitry for measuring an inductance of the write head comprises an impedance meter.

10. A method for monitoring a write head to soft underlayer spacing in a perpendicular magnetic write head comprising:
    providing a magnetic data recording system having a magnetic medium with a magnetically soft underlayer and having a perpendicular magnetic write head configured to fly over the magnetic medium during use;

operating the magnetic data recording system such that the write head flies over the magnetic medium, the write head being separated from the soft underlayer by a soft underlayer spacing;

measuring the inductance of the magnetic write head; and determining the soft underlayer spacing based on the inductance of the write head.

11. A method as in claim 10 wherein the measuring the inductance of the write head further comprises receiving a signal from the write head, and processing the signal through a mixer and phase detector.

12. A method for monitoring a write head to soft underlayer spacing in a perpendicular magnetic write head comprising:

providing a magnetic data recording system having, a magnetic medium with a magnetically soft underlayer and having a perpendicular magnetic write head configured to fly over the magnetic medium during use, the write head comprising a magnetic write pole and a heating element arranged relative to the write pole to heat the write pole;

operating the magnetic data recording system such that the write head flies over the magnetic medium, the write head being separated from the soft underlayer by a first soft underlayer spacing;

measuring the inductance of the magnetic write head;

determining the first soft underlayer spacing based on the inductance of the write head; and operating the heating element to heat the write pole a desired amount to maintain a second, desired soft underlayer spacing.

13. A method as in claim 10 wherein the inductance of the write head is measured by determining a reluctance of the write head.

14. A magnetic data recording system, comprising:

a magnetic write head;

channel electronics circuitry;

arm electronic circuitry electrically connected with the channel circuitry;

directional coupler circuitry electrically connected with the arm electronic circuitry and connected with the write head to receive a signal from the write head;

circuitry connected with the directional coupler circuitry for receiving the signal from the write head and processing the signal from the write head to determine an inductance of the write head; and a magnetic medium having a soft underlayer, the write head being arranged to fly over the magnetic medium and being separated from the soft underlayer by a soft underlayer spacing, and circuitry for determining the soft underlayer spacing based on the determined inductance of the write head.

15. A magnetic data recording system as in claim 14 wherein the circuitry for determining the soft underlayer spacing based on the determined inductance of the write head further comprises mixer and phase detector circuitry.

* * * * *